(12) United States Patent
Song

(10) Patent No.: US 11,953,336 B2
(45) Date of Patent: Apr. 9, 2024

(54) VEHICLE AND CONTROL METHOD THEREOF

(71) Applicants: HYUNDAI MOTOR COMPANY, Seoul (KR); KIA CORPORATION, Seoul (KR)

(72) Inventor: Kyeongsoo Song, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 16 days.

(21) Appl. No.: 17/572,993

(22) Filed: Jan. 11, 2022

(65) Prior Publication Data
US 2022/0282981 A1 Sep. 8, 2022

(30) Foreign Application Priority Data

Mar. 2, 2021 (KR) .................. 10-2021-0027321

(51) Int. Cl.
*G01C 21/34* (2006.01)
*B60L 58/12* (2019.01)

(52) U.S. Cl.
CPC .......... *G01C 21/3469* (2013.01); *B60L 58/12* (2019.02); *G01C 21/3476* (2013.01)

(58) Field of Classification Search
CPC ............ G01C 21/3469; G01C 21/3476; G01C 21/343; B60L 58/12; B60L 2240/62; B60L 2260/52; B60L 58/13; B60L 53/11; B60L 58/10; B60L 2240/64; B60Y 2200/91; Y02T 10/70; Y02T 10/7072; Y02T 90/12
See application file for complete search history.

(56) References Cited

U.S. PATENT DOCUMENTS

| | | | |
|---|---|---|---|
| 2011/0172867 A1* | 7/2011 | Yu | B60L 50/16 903/903 |
| 2011/0178664 A1* | 7/2011 | Yamamoto | B60W 30/18054 180/65.265 |
| 2012/0179318 A1* | 7/2012 | Gilman | |
| 2013/0158868 A1* | 6/2013 | Chen | G01C 21/3469 701/527 |
| 2015/0369619 A1* | 12/2015 | Kim | G01C 21/3469 701/22 |
| 2017/0138750 A1* | 5/2017 | Weber | G01C 21/3679 |
| 2018/0037136 A1* | 2/2018 | Nelson | B60L 53/65 |

(Continued)

FOREIGN PATENT DOCUMENTS

JP 6636088 B2 1/2020

*Primary Examiner* — Amelia Vorce
(74) *Attorney, Agent, or Firm* — Morgan, Lewis & Bockius LLP

(57) ABSTRACT

Disclosed herein is a vehicle and a control method thereof. The vehicle includes a battery, a navigation system, and a control device connected to the battery and the navigation system. The control device is configured to receive information on a point of departure, a destination of the vehicle, a first desired distance to empty (DTE) at a stopover, and a second desired DTE at the destination of the vehicle for charging the battery, configured to generate a virtual driving route of the vehicle, in which a first charging station is designated as a virtual stopover, through the navigation system based on the received information, and configured to output the virtual driving route as a recommended driving route of the vehicle based on an estimated state of charge (SOC) of the battery corresponding to the virtual driving route.

18 Claims, 5 Drawing Sheets

(56) References Cited

U.S. PATENT DOCUMENTS

| | | | |
|---|---|---|---|
| 2018/0143029 A1* | 5/2018 | Nikulin | G01C 21/3415 |
| 2018/0238698 A1* | 8/2018 | Pedersen | G06N 5/048 |
| 2019/0178662 A1* | 6/2019 | Son | B60K 6/48 |
| 2019/0178663 A1* | 6/2019 | Mukai | G01C 21/34 |
| 2019/0186932 A1* | 6/2019 | Milding | B60L 53/60 |
| 2019/0207180 A1* | 7/2019 | Richter | B60L 50/64 |
| 2019/0323848 A1* | 10/2019 | Kurihashi | B60L 58/13 |
| 2022/0063440 A1* | 3/2022 | Goldman-Shenhar | B60L 58/13 |

* cited by examiner

VEHICLE AND CONTROL METHOD THEREOF

CROSS-REFERENCE TO RELATED APPLICATION(S)

This application is based on and claims priority under 35 U.S.C. § 119 to Korean Patent Application No. 10-2021-0027321, filed on Mar. 2, 2021, in the Korean Intellectual Property Office, the disclosure of which is incorporated by reference herein in its entirety.

TECHNICAL FIELD

The disclosure relates to a vehicle, and a control method thereof.

BACKGROUND

An electric vehicle has a shorter range with a single battery charge and a longer time for charging in comparison with an internal combustion vehicle.

Accordingly, when a distance to empty (DTE) of the electric vehicle is less than a distance to a destination, an efficient charging strategy is required.

Charging methods for electric vehicles may be classified into a slow charging method and a fast charging method according to a charging speed.

In the case of a 100 kw-class fast charger, which is currently widely available, when charging an electric vehicle equipped with a 64 kilowatt (kW) battery, a state of charge (SOC) of the battery may be increased 0% to 100% in about 40 minutes, theoretically.

However, in order to protect the battery of the electric vehicle, when the SOC is 80% or more, the fast charger lowers the charging power, and accordingly, the charging time of the electric vehicle rapidly increases. Particularly, as the SOC approaches 100%, the charging power gets lower and lower, and the charging time it takes for the SOC to increase from 0% to 80% is similar to the charging time it takes for the SOC to increase from 80% to 100%.

For a driver of the electric vehicle, in order to drive the electric vehicle to a desired destination, it is necessary to charge the electric vehicle to reach an appropriate SOC at a fast charging station in an appropriate location.

Until now, the driver checks the SOC of his/her electric vehicle and charges the electric vehicle when necessary, and a technology for efficiently guiding the charging of the electric vehicle according to the situation of the driver and the electric vehicle has not been developed.

SUMMARY

Therefore, it is an aspect of the disclosure to provide a vehicle capable of providing an efficient charging strategy to a driver of the vehicle, and a control method thereof.

For example, the vehicle and the control method thereof may provide an efficient charging strategy of the vehicle and a route guidance of the vehicle by considering characteristics of a vehicle that takes a long time to charge, such as an electric vehicle, and characteristics of a fast charger that lowers a charging power from a state of charge (SOC) of 80% or more so as to rapidly increase a charging time, and by using a navigation system of the vehicle.

It is another aspect of the disclosure to provide a vehicle capable of providing information, which is about a charging station appropriate as a stopover for charging the vehicle and a SOC appropriate for driving from the charging station to a destination, to a user, when the vehicle drives using a navigation system, and a control method thereof.

For example, the vehicle and the control method thereof may inform a user of a fast charging station appropriate as a stopover, and an appropriate SOC at the end of charging, when the driver inputs a point of departure and a destination, and the driver additionally sets a desired distance to empty (DTE) at a stopover in which a fast charging station is located, and a desired DTE at the destination through a telematics. Accordingly, the driver can reduce worries about charging the vehicle and thus the driver can efficiently drive and charge the vehicle.

Additional aspects of the disclosure will be set forth in part in the description which follows and, in part, will be obvious from the description, or may be learned by practice of the disclosure.

In accordance with an aspect of the disclosure, a vehicle includes a battery, a navigation system, and a control device connected to the battery and the navigation system. The control device is configured to receive information on a point of departure, a destination of the vehicle, a first desired distance to empty (DTE) at a stopover, and a second desired DTE at the destination of the vehicle for charging the battery, configured to generate a virtual driving route of the vehicle, in which a first charging station is designated as a virtual stopover, through the navigation system based on the received information, and configured to output the virtual driving route as a recommended driving route of the vehicle based on an estimated state of charge (SOC) of the battery corresponding to the virtual driving route.

The control device may be configured to determine the first charging station at a position corresponding to the first desired DTE on the virtual driving route, as the virtual stopover.

The control device may be configured to generate a first virtual driving route including the point of departure and the destination based on the received information, configured to identify a first position corresponding to the first desired DTE information on the first virtual driving route, configured to generate a virtual region with respect to the first position, and configured to identify the first charging station included in the virtual region.

The control device may be configured to, when a plurality of charging stations are included in the virtual region, generate candidate driving routes, in which each of the plurality of charging stations is designated as a stopover, configured to determine one of the candidate driving routes, in which each of the plurality of charging stations is designated as the stopover, as the virtual driving route based on at least one of a driving distance or traffic information, and configured to identify the first charging station included in the determined virtual driving route.

The control device may be configured to calculate an estimated DTE of the vehicle at the virtual stopover based on a current DTE of the vehicle, and a driving distance from the point of departure of the vehicle to the virtual stopover, configured to calculate a first distance from the virtual stopover to the destination based on the estimated DTE, the second desired DTE, and a driving distance from the virtual stopover to the destination of the vehicle, configured to calculate a first SOC corresponding to driving of the vehicle on the virtual driving route, based on the first distance and an average fuel economy of the vehicle, and configured to calculate the estimated SOC based on the first SOC, an estimated remaining amount of the battery at the virtual stopover, and nominal energy of the battery.

The control device may be configured to identify whether the estimated SOC is less than or equal to a predetermined reference SOC, and configured to output the virtual driving route as a recommended driving route of the vehicle in response to the estimated SOC being less than or equal to the predetermined reference SOC.

The control device may be configured to output the second desired DTE at the destination of the vehicle as a recommended third desired DTE at the destination.

The control device may be configured to calculate an additional SOC that allows the battery at the first charging station to be the predetermined reference SOC, based on the predetermined reference SOC, the estimated remaining amount of the battery at the virtual stopover, and the nominal energy of the battery.

The control device may be configured to, in response to the estimated SOC not being less than or equal to the predetermined reference SOC, calculate a recommended third desired DTE at the destination based on the additional SOC, the average fuel economy of the vehicle, the estimated DTE of the vehicle on the virtual stopover, and a driving distance from the virtual stopover to the destination of the vehicle, and configured to output the recommended third desired DTE at the destination.

The estimated DTE of the vehicle at the virtual stopover may be calculated based on the current DTE of the vehicle and the driving distance from the point of departure to the virtual stopover.

In accordance with another aspect of the disclosure, a control method of a vehicle includes receiving information on a point of departure, a destination of the vehicle, a first desired distance to empty (DTE) at a stopover, and a second desired DTE at the destination of the vehicle for charging a battery, generating a virtual driving route of the vehicle, in which a first charging station is designated as a virtual stopover, based on the received information, and outputting the virtual driving route as a recommended driving route of the vehicle based on an estimated state of charge (SOC) of the battery corresponding to the virtual driving route.

The generation of the virtual driving route may include determining the first charging station at a position corresponding to the first desired DTE on the virtual driving route, as the virtual stopover.

The generation of the virtual driving route may include generating a first virtual driving route including the point of departure and the destination based on the received information, identifying a first position corresponding to the first desired DTE information on the first virtual driving route, generating a virtual region with respect to the first position, and identifying the first charging station included in the virtual region.

The identification of the first charging station may include, when a plurality of charging stations are included in the virtual region, generating candidate driving routes, in which each of the plurality of charging stations is designated as a stopover, determining one of the candidate driving routes, in which each of the plurality of charging stations is designated as the stopover, as the virtual driving route based on at least one of a driving distance or traffic information, and identifying the first charging station included in the determined virtual driving route.

The control method may further include calculating an estimated DTE of the vehicle at the virtual stopover based on a current DTE of the vehicle, and a driving distance from the point of departure of the vehicle to the virtual stopover, calculating a first distance from the virtual stopover to the destination based on the estimated DTE, the second desired DTE, and a driving distance from the virtual stopover to the destination of the vehicle, calculating a first SOC corresponding to driving of the vehicle on the virtual driving route, based on the first distance and an average fuel economy of the vehicle, and calculating the estimated SOC based on the first SOC, an estimated remaining amount of the battery at the virtual stopover, and nominal energy of the battery.

The output of the virtual driving route as the recommended driving route of the vehicle may include identifying whether the estimated SOC is less than or equal to a predetermined reference SOC, and outputting the virtual driving route as a recommended driving route of the vehicle in response to the estimated SOC being less than or equal to the predetermined reference SOC.

The control method may further include outputting the second desired DTE at the destination of the vehicle as a recommended third desired DTE at the destination.

The control method may further include calculating an additional SOC that allows the battery at the first charging station to be the predetermined reference SOC, based on the predetermined reference SOC, the estimated remaining amount of the battery at the virtual stopover, and the nominal energy of the battery.

The control method may further include, in response to the estimated SOC not being less than or equal to the predetermined reference SOC, calculating a recommended third desired DTE at the destination based on the additional SOC, the average fuel economy of the vehicle, the estimated DTE of the vehicle on the virtual stopover, and the driving distance from the virtual stopover to the destination of the vehicle, and outputting the recommended third desired DTE at the destination.

The estimated DTE of the vehicle at the virtual stopover may be calculated based on the current DTE of the vehicle and the driving distance from the point of departure to the virtual stopover.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
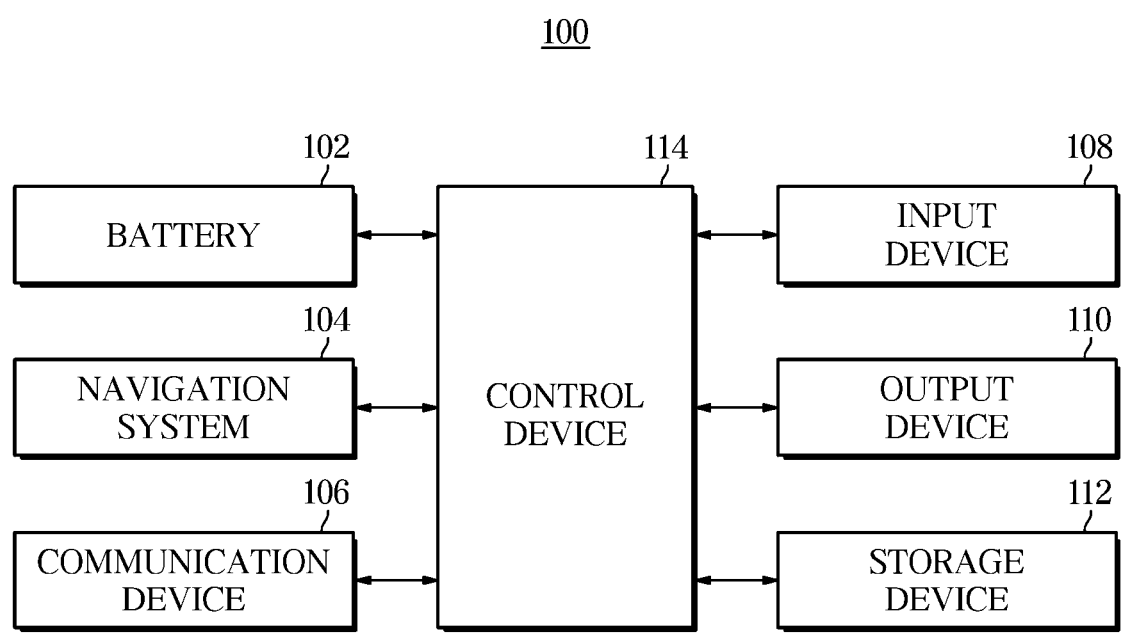
FIG. 1 is a block diagram of a vehicle according to an embodiment of the disclosure.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

The disclosure will be described more fully hereinafter with reference to the accompanying drawings FIG. 1 is a block diagram of a vehicle 100 according to an embodiment of the disclosure.

Referring to FIG. 1, the vehicle 100 may include a battery 102, a navigation system 104, a communication device 106, an input device 108, an output device 110 a storage device 112, and/or a control device 114.

The battery 102 may store energy and supply power to at least one component (also referred to as a device) of the devices included in the vehicle 100.

The navigation system 104 may identify position information and driving environment information of the vehicle 100 by matching position coordinates of the vehicle 100, which is identified through satellite signals, with a map pre-stored in the storage device 112, and then the navigation system 104 may generate driving route information of the vehicle 100. For example, the navigation system 104 may include a global positioning system (GPS) to receive satellite signals propagated from a GPS satellite through GPS. The satellite signal may include the position coordinates of the vehicle.

The navigation system 104 may output navigation information. The navigation information may include driving route information that provides a route to a destination based on information received from a driver of the vehicle 100.

For example, the navigation system 104 may receive destination information from the driver of the vehicle 100, and may determine position information of the vehicle 100, which is identified through satellite signals, as departure point information. Alternatively, the navigation system 104 may receive departure point information and destination information from the driver of the vehicle 100.

The navigation system 104 may provide driving route information of the vehicle 100 based on the departure point information and the destination information.

The communication device 106 may support establishment of a wireless and/or wired communication channel between the vehicle 100 and an external device, such as an external server (not shown) and support communication through the established communication channel, and the communication device 106 may include a communication circuitry. For example, the communication device 106 may include a wired communication module (e.g., a power line communication module) and/or a wireless communication module (e.g., a global positioning system (GPS) module, a cellular communication module, a Wi-Fi communication module, a short-range wireless communication module, and/or a Bluetooth communication module), and the communication device 106 may communicate with an external device using a corresponding communication module among them.

The communication device 106 may include a communication circuitry (also referred to as a transceiver) configured to perform communication among the components (also referred to as devices) of the vehicle 100, such as controller area network (CAN) communication and/or local interconnect network (LIN) communication, through an in-vehicle communication network, and the communication device 106 may include a control circuit configured to control an operation of the communication circuitry.

The input device 108 may include a microphone and/or a touchscreen, and the like.

The microphone may receive a sound, such as a voice of a user of the vehicle 100, and may convert the received sound into an electrical signal.

The touchscreen may receive a touch, a gesture, proximity, or a hovering input.

The output device 110 may include a speaker and/or a display device.

The speaker may convert an electrical signal into a sound and output the sound.

The display device may display various contents, such as texts, images, videos, icons and/or symbols. The display device may include a touch screen.

The navigation system 104, the input device 108, and/or the output device 110 described above may be included in an Audio, Video, Navigation (AVN) device (not shown) of the vehicle 100. The AVN device refers to a multimedia device in which audio, video and/or navigation functions are integrated into one. The AVN device may be provided on a center fascia of the vehicle 100, but is not limited thereto.

Through a user manipulation, the AVN device may receive departure point information, destination information, desired distance to empty (DTE) information at a stopover and/or desired DTE information at the destination, and the AVN device may output optimal driving route information and recommended state of charge (SOC) according to embodiments to be described later.

The storage device 112 may store various data used by at least one component of the vehicle 100, such as input data or output data for a software program and instructions related thereto. The storage device 112 may include a memory, such as a volatile memory and/or a non-volatile memory.

The control device 114 may control at least one other component (e.g., a device and/or software (software program)) of the vehicle 100, and may perform various data processing and calculations. The control device 114 may include a processor and a memory.

The control device 114 may include a battery management system (BMS) (not shown) configured to monitor a status of the battery 102 of the vehicle 100.

The control device 114 may include a vehicle control unit (VCU) configured to calculate the DTE of the vehicle 100 and communicate with the BMS and the AVN device.

The control device 114 may include an electronic control unit (ECU) configured to control a power system of the vehicle 100.

The control device 114 may match an optimal charging station for charging the battery 102, such as a fast charging station, based on the desired SOC at the stopover of the user. Further, the control device 114 may output an optimal desired DTE at the destination in consideration of the fast charging characteristics of the fast charging station.

For example, from the user through the input device 108, the control device 114 may receive necessary information, departure point information, destination information, first desired DTE information at a stopover in which a charging station for charging the battery 102 of the vehicle 100 is located, and/or second desired DTE information at the destination of the vehicle 100. Based on the received information, the control device 114 may provide an optimal driving route of the vehicle 100, and an estimated DTE at a time of arrival when the vehicle drives along the optimal driving route.

Embodiments of detailed operations of the control device 114 will be described in detail with reference to FIGS. 2 to 5 to be described later.

Figure 2:
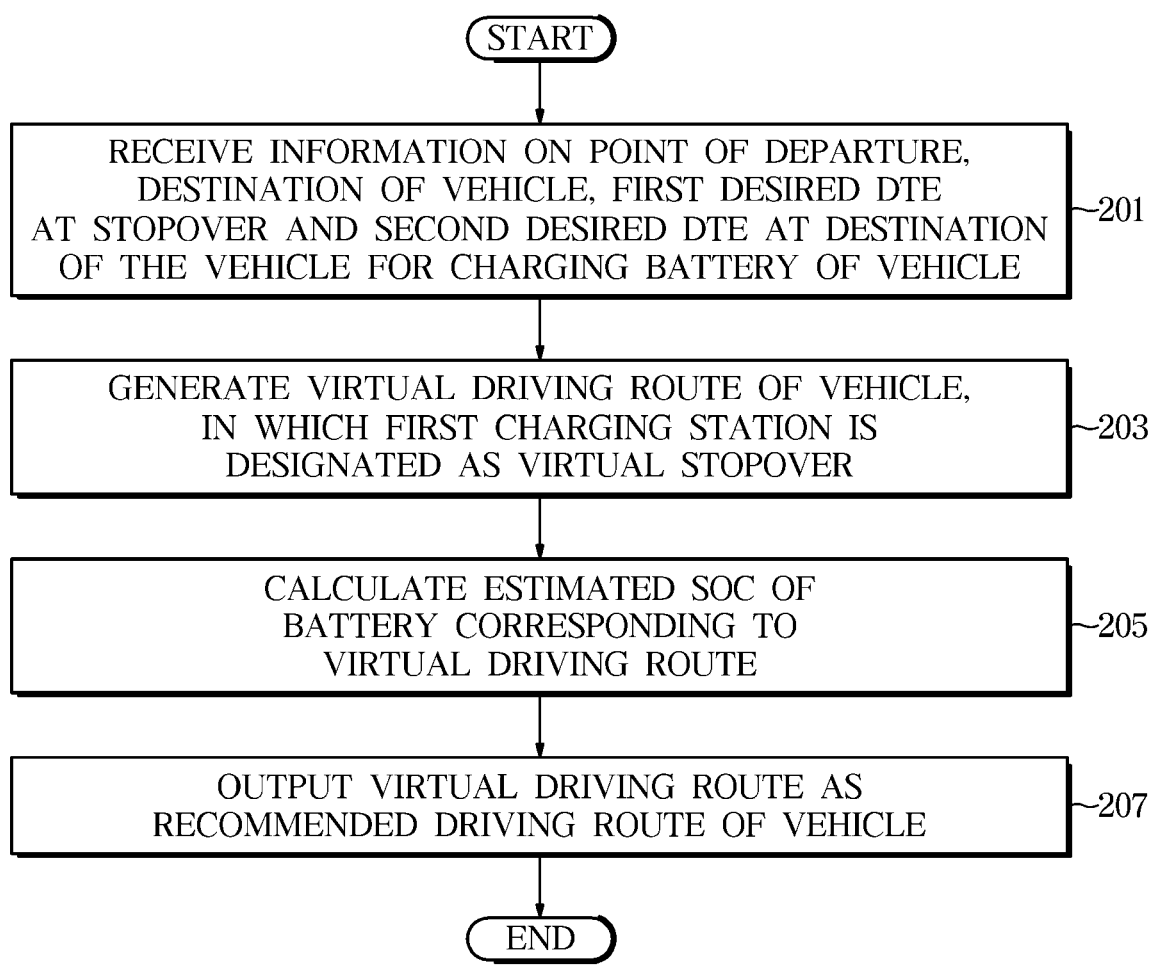
FIG. 2 is a flow chart of an operation of the vehicle according to an embodiment of the disclosure.

FIG. 2 is a flow chart of an operation of the vehicle 100 (and/or the control device 114 of the vehicle 100) according to an embodiment of the disclosure.

The vehicle 100 may receive information on a point of departure, a destination, a first desired DTE at a stopover and a second desired DTE at the destination of the vehicle 100 for charging the battery 102 of the vehicle 100 (201).

Based on the information received in the operation 201 described above, the vehicle 100 may generate a virtual driving route of the vehicle 100, in which a first charging station is designated as a virtual stopover, through the navigation system 104 (203).

The vehicle 100 may determine the first charging station at a position corresponding to the first desired DTE on the virtual driving route, as the virtual stopover.

For example, the vehicle 100 may generate a first virtual driving route including the point of departure and the destination based on the received information through the navigation system 104. The vehicle 100 may identify a first position corresponding to the first desired DTE information on the first virtual driving route. The vehicle 100 may generate a virtual region with respect to the first position, and may identify the first charging station included in the virtual region.

When a plurality of charging stations are included in the virtual region, the vehicle 100 may generate candidate driving routes in which each of the plurality of charging stations is designated as a stopover. The vehicle 100 may determine one of the candidate driving routes, in which each of the plurality of charging stations is designated as the stopover, as the virtual driving route based on at least one of a driving distance or traffic information. The vehicle 100 may identify the first charging station included in the determined virtual driving route.

The vehicle 100 may calculate an estimated SOC of the battery 102 corresponding to the virtual driving route (205).

The vehicle 100 may calculate the estimated DTE of the vehicle 100 at the virtual stopover based on a current DTE of the vehicle 100 and a driving distance from the destination of the vehicle 100 to the virtual stopover. The vehicle 100 may calculate a first distance from the virtual stopover to the destination based on the estimated DTE, the second desired DTE, and the driving distance from the virtual stopover to the destination of the vehicle 100. The vehicle 100 may calculate a first SOC corresponding to driving of the virtual driving route of the vehicle 100 based on the first distance of the vehicle 100 and an average fuel economy of the vehicle 100. The vehicle 100 may calculate the estimated SOC based on the first SOC, an estimated remaining amount of the battery 102 at the virtual stopover, and nominal energy of the vehicle 100. For example, the average fuel economy and the nominal energy of the battery 102 may be predetermined.

The vehicle 100 may output the virtual driving route as a recommended driving route of the vehicle 100 based on the estimated SOC of the battery 102 (207).

The vehicle 100 may identify whether the estimated SOC is less than or equal to a predetermined reference SOC. The vehicle 100 may output the virtual driving route as a recommended driving route of the vehicle 100 in response to the estimated SOC being less than or equal to the predetermined reference SOC.

In addition to the above-described embodiment, in response to the estimated SOC not being less than or equal to the predetermined reference SOC, the vehicle 100 may calculate a recommended third desired DTE at the destination, based on an additional SOC, which is described later, the average fuel economy of the vehicle 100, the estimated DTE of the vehicle 100 at the virtual stopover, and the driving distance from the virtual stopover to the destination of the vehicle 100. Further, the vehicle 100 may output the second desired DTE at the destination of the vehicle 100 as the recommended third desired DTE at the destination.

The above-described additional SOC is a charge amount that is added to allow the battery 102 at the first charging station to be the predetermined reference SOC, and the additional SOC may be calculated based on the predetermined reference SOC, the estimated remaining amount of the battery 102 at the virtual stopover, and the nominal energy of the vehicle 100.

In addition, the estimated DTE of the vehicle 100 at the virtual stopover may be calculated based on the current DTE of the vehicle 100 and the driving distance from the point of departure to the virtual stopover.

Figure 3:
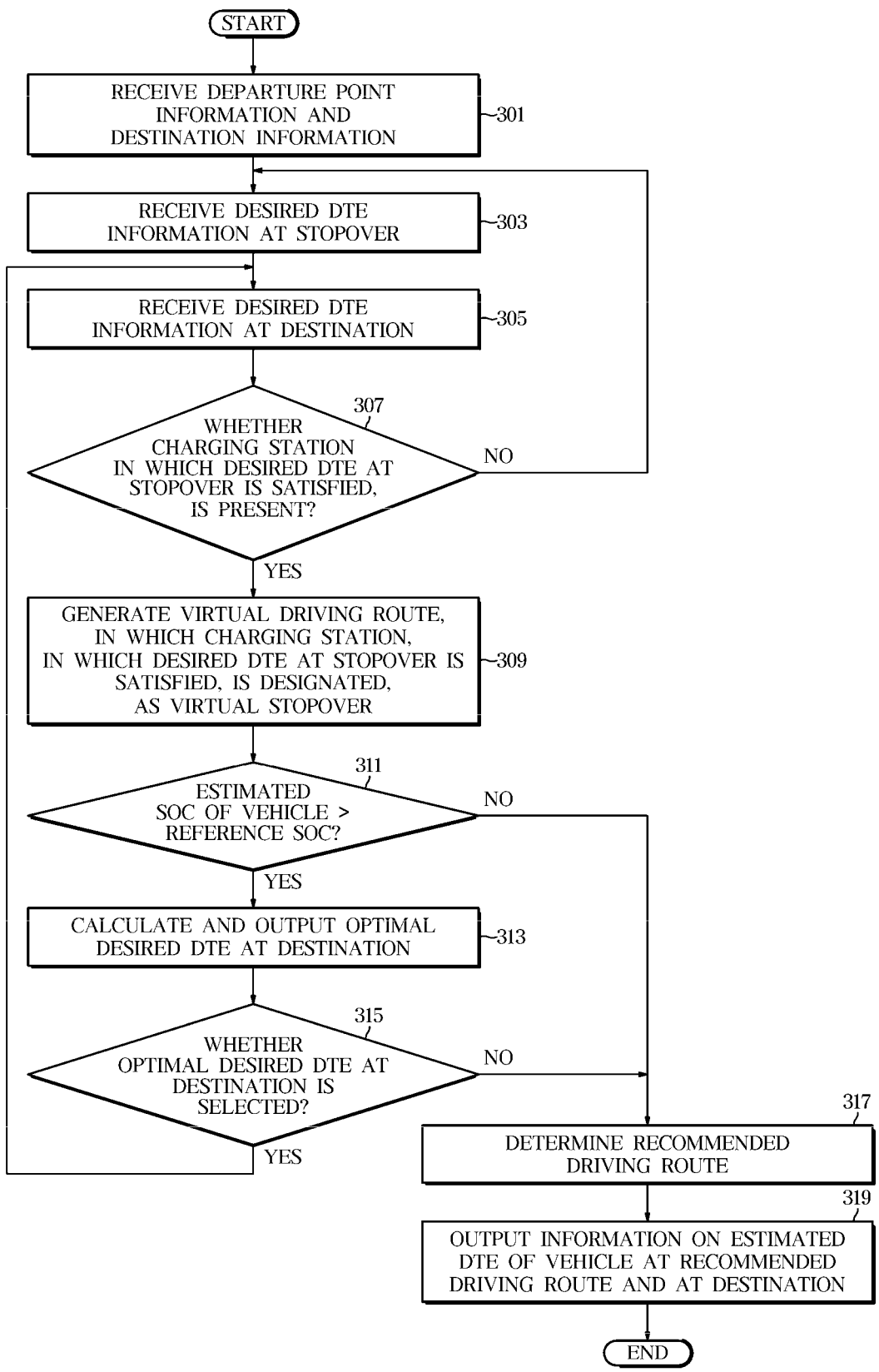
FIG. 3 is a flow chart of an operation of the vehicle according to an embodiment of the disclosure.
Figure 4:
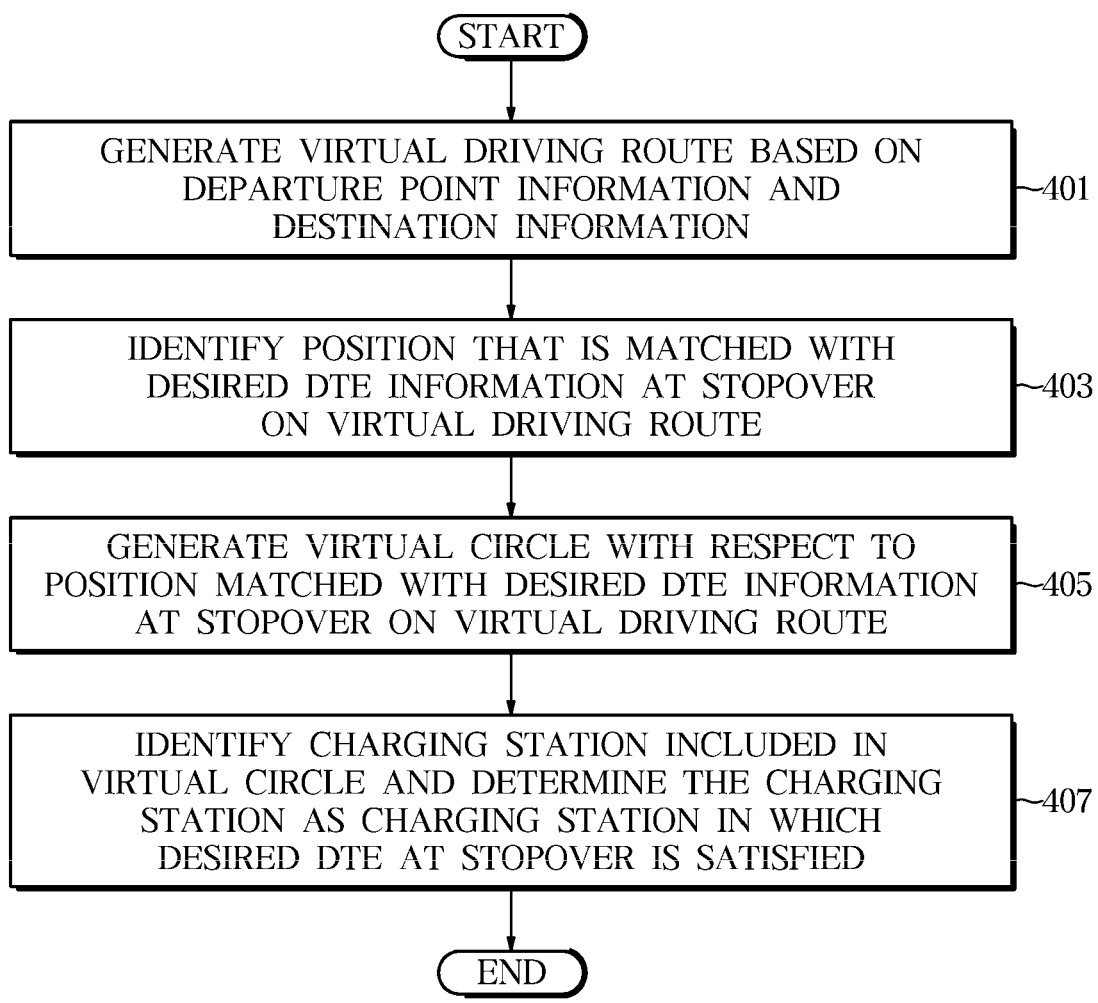
FIG. 4 is a flow chart of an operation for identifying whether a charging station, in which a desired distance to empty (DTE) at a stopover of the vehicle is satisfied, is present according to an embodiment of the disclosure.
Figure 5:
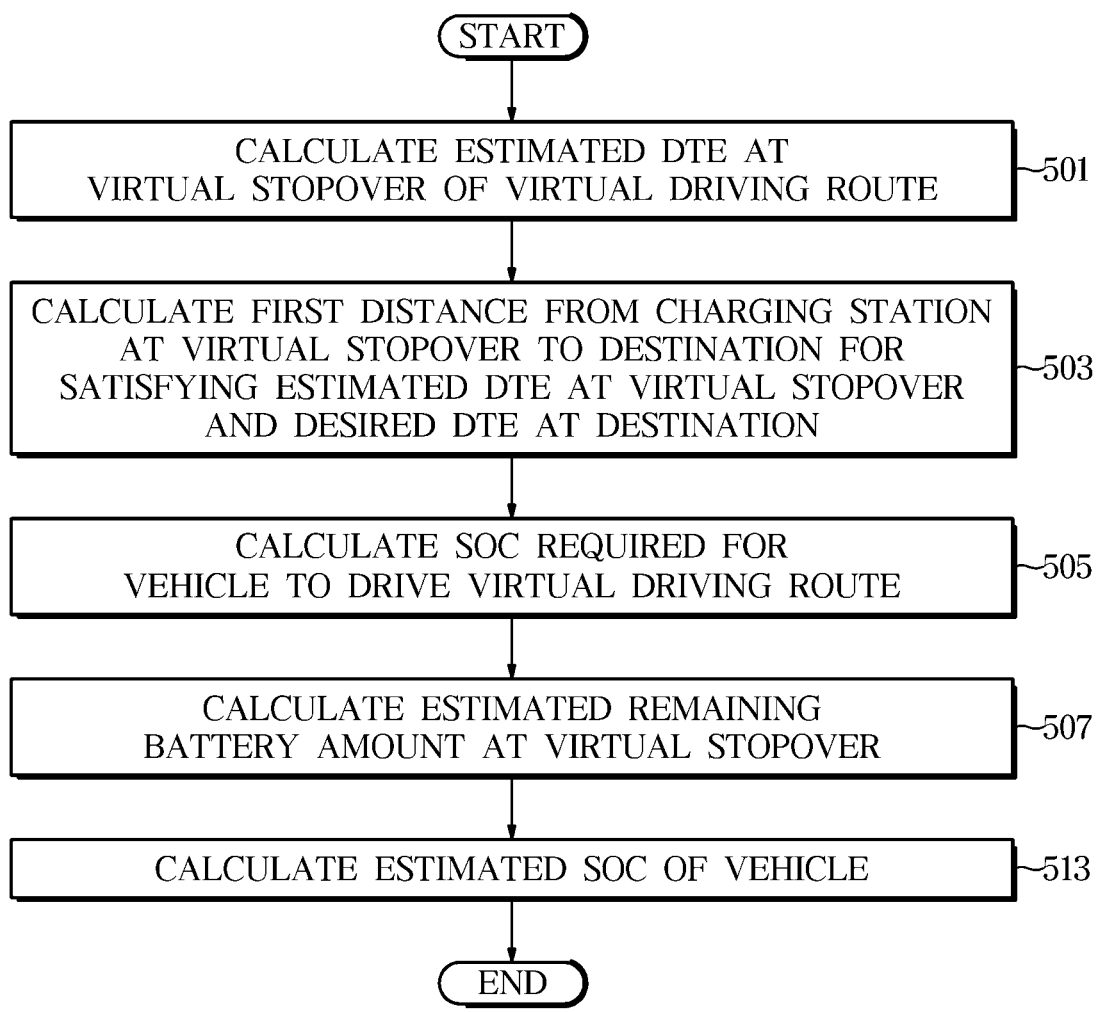
FIG. 5 is a flow chart of an operation for identifying whether an estimated state of charge (SOC) of the vehicle is less than or equal to a predetermined SOC according to an embodiment of the disclosure.

FIG. 3 is a flow chart of an operation of the vehicle 100 (and/or the control device 114 of the vehicle 100) according to an embodiment of the disclosure. FIG. 4 is a flow chart of an operation for identifying whether a charging station, in which a desired DTE at a stopover of the vehicle 100 (and/or the control device 114 of the vehicle 100) is satisfied, is present according to an embodiment of the disclosure. FIG. 5 is a flow chart of an operation for identifying whether the estimated SOC of the battery 102 of the vehicle 100 (and/or the control device 114 of the vehicle 100) is less than or equal to the predetermined SOC according to an embodiment of the disclosure.

The vehicle 100 may receive the departure point information and the destination information of the vehicle 100 (301).

The vehicle 100 may receive the departure point information and the destination information of the vehicle 100 from an external electronic device through the communication device 106. Alternatively, the vehicle 100 may receive the departure point information and the destination information of the vehicle 100 based on a user input through the input device 108.

The vehicle 100 may receive desired DTE information (also referred to as first desired DTE information) at the stopover (303).

The desired DTE information at the stopover indicates DTE information of the vehicle 100 desired by a user when the vehicle 100 arrives at the stopover.

The vehicle 100 may receive the desired DTE information at the stopover of the vehicle 100 from an external electronic device through the communication device 106. Alternatively, the vehicle 100 may receive the desired DTE information at the stopover of the vehicle 100 based on a user input through the input device 108.

The vehicle 100 may receive desired DTE information (also referred to as second desired DTE information) at the destination (305).

The desired DTE information at the destination indicates DTE information of the vehicle 100 desired by the user when the vehicle 100 arrives at the destination.

The vehicle 100 may receive the desired DTE information at the destination of the vehicle 100 from an external electronic device through the communication device 106. Alternatively, the vehicle 100 may receive the desired DTE information at the destination of the vehicle 100 based on a user input through the input device 108. Alternatively, the vehicle 100 may receive the desired DET information at the destination of the vehicle 100 that is selected based on a user input according to an operation 319 which will be described later.

The vehicle 100 may identify whether a charging station (also referred to as a first charging station), in which the desired DTE at the stopover is satisfied, is present or not based on the desired DTE information at the stopover received in an operation 303 (307).

The vehicle 100 may identify whether a charging station (also referred to as a first charging station), in which the desired DTE at the stopover is satisfied, is present or not based on the desired DTE information at the stopover through the navigation system 104. For example, the identification of whether the charging station, in which the desired DTE at the stopover is satisfied, is present or not may be performed according to the following operations of the vehicle 100 as illustrated in FIG. 4.

Referring to FIG. 4, the vehicle 100 may generate a virtual driving route through the navigation system 104 based on the departure point information and the destination information received in the operation 301 (401).

The vehicle 100 may generate the virtual driving route through a node connection method.

On the virtual driving route, the vehicle 100 may identify a position that is matched with the desired DTE information at the stopover (403).

When it is assumed that the current DTE of the vehicle is "A", the desired DTE at the stopover is "B", the driving distance along the virtual driving route generated in the operation 401 is "C", and a driving distance to a position P matched with the desired DTE information at the stopover on the virtual driving route generated in the operation 401 is "d", an operation 403 will be described as follows.

The estimated DTE at the destination when the vehicle 100 arrives at the destination may be a value calculated by an expression A-C.

When the value calculated by the expression A-C is less than or equal to B, the vehicle 100 may determine a position, in which a value calculated by an expression A-D is equal to B, on the virtual driving route as the position P matched with the desired DTE information at the stopover on the virtual driving route.

On the other hand, when the value calculated by the expression A-C is greater than B, the vehicle 100 may output a message such as "Increase the desired DTE at the stopover". According to the output of this message, the vehicle 100 may allow the user to re-input the desired DTE at the stopover, and thus the operation 303 may be performed again, and accordingly, the operation 403 may be performed again.

The vehicle 100 may generate a virtual circle with respect to the position matched with the desired DTE information at the stopover on the virtual driving route (405).

The vehicle 100 may identify a charging station included in the virtual circle and determine the charging station as a charging station in which the desired DTE at the stopover is satisfied (407).

When the charging station, in which the desired DTE at the stopover is satisfied, is present, the vehicle 100 may perform an operation 309, and when the charging station, in which the desired DTE at the stopover is satisfied, is not present, the vehicle 100 may perform the operation 303 again.

For example, the vehicle 100 may identify whether the charging station is included in the virtual circle.

When a single charging station is present in the virtual circle, the vehicle 100 may determine the one charging station as the charging station, in which the desired DTE at the stopover is satisfied.

When a plurality of charging stations are present in the virtual circle, the vehicle 100 may generate a plurality of candidate driving routes, in which each of the plurality of charging stations is designated as the stopover, through the node connection method. The vehicle 100 may select one of the plurality of candidate driving routes as an optimal candidate driving route, and may determine the optimal candidate driving route as the charging station, in which the desired DTE at the stopover is satisfied. For example, the selection of the optimal candidate driving route may be performed based on the driving distance and/or traffic information of each of the driving routes.

On the other hand, when the charging station is not present in the virtual circle, the vehicle 100 may output a message such as "Increase the desired DTE at the stopover". According to the output of this message, the vehicle 100 may allow the user to re-input the desired DTE at the stopover, and thus the operation 303 may be performed again, and accordingly, the operation 403 may be performed again.

The vehicle 100 may generate a virtual driving route in which the charging station, in which the desired DTE at the stopover is satisfied, is designated as the virtual stopover (309).

The vehicle 100 may determine whether an estimated SOC of the battery 102 (also referred to as an estimated SOC at the end of charging) corresponding to the desired DTE information at the stopover received through the operation 303 and the virtual driving route generated through operation 309 is greater than the predetermined reference SOC (311).

For example, the estimated SOC of the battery 102 may represent that a SOC of the battery 102 that is expected when the charging is terminated after the battery 102 is charged to satisfy the desired DTE at the stopover, at the charging station of the virtual stopover during the vehicle 100 drives on the virtual driving route.

The predetermined reference SOC may be 80 percentage (%).

The identification of whether the estimated SOC of the battery 102 of the vehicle 100 is equal to or less than the predetermined reference SOC may be performed according to operations of the vehicle 100 as illustrated in FIG. 5.

The vehicle 100 may calculate the estimated DTE at the virtual stopover of the virtual driving route (501).

For example, when it is assumed that the current DTE of the vehicle is "a", and the driving distance from the point of departure to the stopover of the virtual driving route is "b", the estimated DTE at the virtual stopover of the virtual driving route may be a value calculated by an expression a-b.

The vehicle 100 may calculate a first distance (referred to as "required charging distance) from the charging station at the virtual stopover to the destination for satisfying the estimated DTE at the virtual stopover calculated through the operation 501, and the desired DTE at the destination received through the operation 305 (503).

The vehicle 100 may calculate the first distance based on the estimated DTE at the virtual stopover calculated through the operation 501, the desired DTE at the destination received through the operation 305 and/or the driving distance from the virtual stopover to the destination.

For example, when it is assumed that the estimated DTE at the virtual stopover is "c", the desired DTE at the destination is "d", and the driving distance from the virtual stopover to the destination is "e", a virtual distance from the charging station at the virtual stopover to the destination may be a value calculated by an expression d+e−c.

The vehicle 100 may calculate a SOC required for the vehicle 100 to drive the virtual driving route based on the first distance calculated in the operation 503 and/or the average fuel economy of the vehicle 100 (505).

For example, when it is assumed that the first distance (km) is "f", and the average fuel economy (km/kWh) of the vehicle 100 is "g", the SOC (kWh) required for the vehicle 100 to drive the virtual driving route may be a value calculated by an expression f÷g. For example, the average fuel economy of the vehicle 100 may be trained by the vehicle 100 during the performance of any one of the operation 301 to the operation 305.

The vehicle 100 may calculate an estimated remaining battery amount at the virtual stopover based on the estimated DTE at the virtual stopover and/or the average fuel economy of the vehicle 100 (507).

For example, when it is assumed that the estimated DTE at the virtual stopover is "c", and the average fuel economy (km/kWh) of the vehicle 100 is "g", the estimated remaining battery amount (kWh) at the virtual stopover may be a value calculated by an expression c÷g.

The vehicle 100 may calculate the estimated SOC of the battery 102 corresponding to the received desired DTE information at the stopover and the virtual driving route, based on the SOC required for the vehicle 100 to drive the virtual driving route, the estimated remaining battery amount at the virtual stopover and/or the nominal energy of the battery 102 of the vehicle 100 (513).

The estimated SOC of the battery 102 may represent a SOC of the battery 102 that is expected to be fully charged when assuming that the vehicle 100 charges the battery 102 to satisfy the desired DTE at the stopover, at the charging station of the virtual stopover during the vehicle 100 drives the virtual driving route.

For example, when it is assumed that the SOC required for the vehicle 100 to drive the virtual driving route is "h", the estimated remaining battery amount at the virtual stopover is "i" and the nominal energy of the battery 102 is "j", the estimated SOC (%) of the battery 102 may be a value calculated by an expression (h+i)÷j. For example, the nominal energy of the battery 102 may be predetermined.

When the estimated SOC of the battery 102 of the vehicle 100 is greater than the predetermined reference SOC, the vehicle 100 may perform an operation 313, and when the estimated SOC of the battery 102 of the vehicle 100 is less than or equal to the predetermined reference SOC, the vehicle 100 may perform an operation 317.

In response to the estimated SOC at the end of charging of the vehicle 100 not being greater than the predetermined reference SOC, the vehicle 100 may calculate and output an optimal desired DTE (or referred to as "a third desired DTE) at the destination of the vehicle 100 (313).

The vehicle 100 may calculate a SOC $h_{80}$ at the charging station that allows the estimated SOC of the battery 102 corresponding to the received desired DTE information at the stopover and the virtual driving route to be 80%.

For example, when it is assumed that the estimated remaining battery amount at the virtual stopover is "i" and the nominal energy of the battery 102 is "j", $h_{80}$ (km) may be a value calculated by an expression (0.8×j)−i.

The vehicle 100 may calculate a desired DTE $d_{80}$ at the destination, which allows the estimated SOC of the battery 102 corresponding to the received desired DTE information at the stopover and the virtual driving route to be 80%, as an optimal desired DTE at the destination.

For example, when it is assumed that the average fuel economy (km/kWh) of the vehicle 100 is "g", the estimated DTE at the virtual stopover is "c", and the driving distance from the virtual stopover to the destination is "e", $d_{80}$ (km) may be a value calculated by an expression $h_{80}×g+c−e$.

The vehicle 100 may identify whether the optimal desired DTE at the destination of vehicle 100 is selected based on a user input (315).

When the optimal desired DTE at the destination of vehicle 100 is selected, the vehicle 100 may perform the operation 305 again, and when the optimal desired DTE at the destination of vehicle 100 is not selected, the vehicle 100 may perform an operation 317.

The vehicle 100 may determine a recommended driving route in response to the estimated SOC at the end of charging of the vehicle 100 being greater than the predetermined reference SOC (317).

The vehicle 100 may determine the virtual driving route generated according to the operation 309 as the recommended driving route.

The vehicle 100 may output information on the estimated DTE at the recommended driving route and at the destination of the vehicle 100 (319).

The estimated DTE at the destination may be a value obtained by subtracting a driving distance value along the virtual driving route from the current DTE value of the vehicle calculated for the operation 403.

Meanwhile, in the operation 311 according to the above-described embodiment, an additional condition for the operation of the vehicle 100 may be further included. For example, the vehicle 100 may perform the operation 313 when the estimated SOC of the battery 102 is greater than the reference SOC of 80% and less than or equal to the nominal energy of the battery 102. That is, when it is assumed that the SOC required for the vehicle 100 to drive the virtual driving route is "h", the estimated remaining battery amount at the virtual stopover is "i", and the nominal energy of the battery 102 is "j", and when an expression 0.8×j<h+i≤j is satisfied, the vehicle 100 may perform the operation 313.

For example, when the estimated SOC of the vehicle is greater than the reference SOC of 80% and less than or equal to the nominal energy of the battery 102, the vehicle 100 may output a message such as "Recommended destination desired DTE is $d_{80}$. Are you sure you want to proceed like this? Yes/No". When "no" is selected by the user, the vehicle 100 may perform an operation 317 to be described later. When "yes" is selected by the user, the vehicle 100 may allow the user to re-input the desired DTE at the destination, and thus the operation 305 may be performed again.

In addition to the above-described embodiment, after the operation 309, the vehicle 100 may calculate a SOC $h_{100}$ at the charging station that allows the estimated SOC of the battery 102 corresponding to the received desired DTE information at the stopover and the virtual driving route to be 100%.

For example, when it is assumed that the estimated remaining battery amount at the virtual stopover is "i" and the nominal energy of the battery 102 is "j", $h_{100}$ (kWh) may be a value calculated by an expression j−i.

The vehicle 100 may calculate a desired DTE $d_{100}$ at the destination, which allows the estimated SOC of the battery 102 corresponding to the received desired DTE information at the stopover and the virtual driving route to be 100%.

For example, when it is assumed that the average fuel economy (km/kWh) of the vehicle 100 is "g", the estimated DTE at the virtual stopover is "c", and the driving distance from the virtual stopover to the destination is "e", $d_{100}$ (km) may be a value calculated by an expression $h_{100} \times g+c-e$.

When it is assumed that the SOC required for the vehicle 100 to drive on the virtual driving route is "h", the estimated remaining battery amount at the virtual stopover is "i", and the nominal energy of the battery 102 is "j", and when an expression h+i>j is satisfied, the vehicle 100 may output a message such as "The maximum desired DTE at destination is $d_{100}$. Please lower the desired DTE at the destination to $d_{100}$ or less." According to the output of this message, the vehicle 100 may allow the user to re-input the desired DTE at the destination, and thus the operation 305 may be performed again.

In addition, in the embodiment of FIG. 3 described above, it has been described that the departure point information and the destination information are received. However, according to another embodiment, the vehicle 100 may identify a current position of the vehicle 100 based on the GPS signals received through the GPS module, and set the current position of the vehicle 100 as the departure point information of the vehicle 100.

Further, in addition to the above-described embodiment, the vehicle 100 may learn a change in charging power according to a SOC section, and may calculate the charging time for each section. For example, the vehicle 100 may learn an average charging power having the SOC of 0 to 80%, an average charging power having the SOC of 80 to 90%, and an average charging power having the SOC of 90 to 100%. Accordingly, the vehicle 100 may calculate the charging time of the battery 102 for each section.

In addition to the above-described embodiment, the vehicle 100 may calculate a charging time required at the charging station according to the desired DTE at the destination selected by the driver, and an estimated time of arrival at the destination after charging, and the vehicle 100 may provide the charging time and the estimated time of arrival to the user.

As is apparent from the above description, the vehicle and the control method thereof may provide a charging station for charging the battery of the vehicle, such as the optimal driving route that passes the fast charging station. Further, the vehicle and the control method thereof may enhance the marketability of the vehicle in the electric vehicle market in the future by enhancing driver convenience.

For example, when the current DTE of the vehicle is less than or equal to the driving distance from the point of departure to the destination, the vehicle and the control method thereof may match an optimal fast charging station capable of charging the vehicle's battery to allow the vehicle to arrive at the destination. Further, the vehicle and the control method thereof may provide an optimal desired destination DTE and an optimal driving route in consideration of the characteristics of fast charging.

For example, when the current DTE of the vehicle is greater than the driving distance from the point of departure to the destination, the vehicle and the control method thereof may suggest an optimal desired destination DTE and an optimal route in consideration of the characteristics of fast charging.

Meanwhile, the disclosed embodiments may be embodied in the form of a recording medium storing instructions executable by a computer. The instructions may be stored in the form of program code and, when executed by a processor (such as a processor include in the control device 114), may generate a program module to cause the processor to perform the operations of the disclosed embodiments. The recording medium may be embodied as a non-transitory computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
   a battery;
   a navigation system; and
   a control device connected to the battery and the navigation system;
   wherein the control device is configured to:
   receive information on a point of departure, a destination of the vehicle, a first desired distance to empty (DTE) at a stopover, and a second desired DTE at the destination of the vehicle for charging the battery, based on an external electronic device through the communication device or a user input through an input device;
   generate a first virtual driving route comprising the point of departure and the destination, through the navigation system based on the received information;
   identify a first position corresponding to the first desired DTE information on the first virtual driving route;
   generate a virtual region with respect to the first position;
   identify a first charging station included in the virtual region;
   generate a virtual driving route of the vehicle, in which the first charging station is designated as a virtual stopover; and control the navigation system to display the virtual driving route of the vehicle based on an estimated state of charge (SOC) of the battery corresponding to the virtual driving route, wherein the first desired DTE indicates DTE information of the vehicle desired by a user when the vehicle arrives at the stopover, wherein the control device receives the first desired DTE information at the stopover of the vehicle based on a user input through the input device, and wherein, when the virtual region does not include a charging station, the control device outputs a message to notify the user to increase the first desired DTE at the stopover so as to allow the user to re-input the first desired DTE at the stopover.

2. The vehicle of claim 1, wherein
the control device is configured to determine the first charging station at a position corresponding to the first desired DTE on the virtual driving route, as the virtual stopover.

3. The vehicle of claim 1, wherein
the control device is configured to:
when a plurality of charging stations are included in the virtual region, generate candidate driving routes, in which each of the plurality of charging stations is designated as a stopover;
determine one of the candidate driving routes, in which each of the plurality of charging stations is designated as the stopover, as the virtual driving route based on at least one of a driving distance or traffic information; and
identify the first charging station included in the determined virtual driving route.

4. The vehicle of claim 1, wherein
the control device is configured to:
calculate an estimated DTE of the vehicle at the virtual stopover based on a current DTE of the vehicle, and a driving distance from the point of departure of the vehicle to the virtual stopover;
calculate a first distance from the virtual stopover to the destination based on the estimated DTE, the second desired DTE, and a driving distance from the virtual stopover to the destination of the vehicle;
calculate a first SOC corresponding to driving of the vehicle on the virtual driving route, based on the first distance and an average fuel economy of the vehicle; and
calculate the estimated SOC based on the first SOC, an estimated remaining amount of the battery at the virtual stopover, and nominal energy of the battery.

5. The vehicle of claim 1, wherein
the control device is configured to:
identify whether the estimated SOC is less than or equal to a predetermined reference SOC; and
control the navigation system to display the virtual driving route of the vehicle in response to the estimated SOC being less than or equal to the predetermined reference SOC.

6. The vehicle of claim 1, wherein
the control device is configured to output the second desired DTE at the destination of the vehicle as a recommended third desired DTE at the destination.

7. The vehicle of claim 5, wherein
the control device is configured to calculate an additional SOC that allows the battery at the first charging station to be the predetermined reference SOC, based on the predetermined reference SOC, the estimated remaining amount of the battery at the virtual stopover, and the nominal energy of the battery.

8. The vehicle of claim 7, wherein
the control device is configured to:
in response to the estimated SOC not being less than or equal to the predetermined reference SOC, calculate a recommended third desired DTE at the destination based on the additional SOC, the average fuel economy of the vehicle, the estimated DTE of the vehicle on the virtual stopover, and a driving distance from the virtual stopover to the destination of the vehicle; and
output the recommended third desired DTE at the destination.

9. The vehicle of claim 8, wherein
the control device is configured to calculate an estimated DTE of the vehicle at the virtual stopover based on a current DTE of the vehicle, and a driving distance from the point of departure of the vehicle to the virtual stopover.

10. A control method of a vehicle comprising:
receiving information on a point of departure, a destination of the vehicle, a first desired distance to empty (DTE) at a stopover, and a second desired DTE at the destination of the vehicle for charging a battery based on an external electronic device through the communication device or a user input through an input device;
generating a first virtual driving route comprising the point of departure and the destination through a navigation system based on the received information;
identifying a first position corresponding to the first desired DTE information on the first virtual driving route;
generating a virtual region with respect to the first position; and
identifying a first charging station included in the virtual region;
generating a virtual driving route of the vehicle, in which the first charging station is designated as a virtual stopover, through the navigation system;
controlling the navigation system to display the virtual driving route of the vehicle based on an estimated state of charge (SOC) of the battery corresponding to the virtual driving route; and
when the virtual region does not include a charging station, outputting a message to notify a user to increase the first desired DTE at the stopover so as to allow the user to re-input the first desired DTE at the stopover,
wherein the first desired DTE indicates DTE information of the vehicle desired by the user when the vehicle arrives at the stopover, and
wherein the first desired DTE is received based on a user input through the input device.

11. The control method of claim 10, wherein
the generation of the virtual driving route comprises determining the first charging station at a position corresponding to the first desired DTE on the virtual driving route, as the virtual stopover.

12. The control method of claim 10, wherein
the identification of the first charging station comprises:
when a plurality of charging stations are included in the virtual region, generating candidate driving routes, in which each of the plurality of charging stations is designated as a stopover; and
determining one of the candidate driving routes, in which each of the plurality of charging stations is designated as the stopover, as the virtual driving route based on at least one of a driving distance or traffic information; and identifying the first charging station included in the determined virtual driving route.

13. The control method of claim 10, further comprising:

calculating an estimated DTE of the vehicle at the virtual stopover based on a current DTE of the vehicle, and a driving distance from the point of departure of the vehicle to the virtual stopover;

calculating a first distance from the virtual stopover to the destination based on the estimated DTE, the second desired DTE, and a driving distance from the virtual stopover to the destination of the vehicle;

calculating a first SOC corresponding to driving of the vehicle on the virtual driving route, based on the first distance and an average fuel economy of the vehicle; and calculating the estimated SOC based on the first SOC, an estimated remaining amount of the battery at the virtual stopover, and nominal energy of the battery.

14. The control method of claim 10, wherein the control of the navigation system to display the virtual driving route of the vehicle comprises:

identifying whether the estimated SOC is less than or equal to a predetermined reference SOC; and controlling the navigation system to display the virtual driving route of the vehicle in response to the estimated SOC being less than or equal to the predetermined reference SOC.

15. The control method of claim 10, further comprising:

outputting the second desired DTE at the destination of the vehicle as a recommended third desired DTE at the destination.

16. The control method of claim 14, further comprising:

calculating an additional SOC that allows the battery at the first charging station to be the predetermined reference SOC, based on the predetermined reference SOC, the estimated remaining amount of the battery at the virtual stopover, and the nominal energy of the battery.

17. The control method of claim 16, further comprising:

in response to the estimated SOC not being less than or equal to the predetermined reference SOC, calculating a recommended third desired DTE at the destination based on the additional SOC, the average fuel economy of the vehicle, the estimated DTE of the vehicle on the virtual stopover, and a driving distance from the virtual stopover to the destination of the vehicle; and outputting the recommended third desired DTE at the destination.

18. The control method of claim 17, further comprising:

calculating an estimated DTE of the vehicle at the virtual stopover based on a current DTE of the vehicle, and a driving distance from the point of departure of the vehicle to the virtual stopover.

* * * * *